(12) United States Patent
Kumar et al.

(10) Patent No.: US 12,462,901 B2
(45) Date of Patent: Nov. 4, 2025

(54) METHOD AND SYSTEM FOR PERFORMANCE OPTIMIZATION OF FLUE GAS DESULPHURIZATION (FGD) UNIT

(71) Applicant: Tata Consultancy Services Limited, Mumbai (IN)

(72) Inventors: Rajan Kumar, Pune (IN); Pallavi Venugopal Minimol, Pune (IN); Sagar Srinivas Sakhinana, Pune (IN); Abhishek Baikadi, Pune (IN); Duc Doan, Tokyo (JP); Vishnu Swaroopji Masampally, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 972 days.

(21) Appl. No.: 17/597,133

(22) PCT Filed: Jun. 27, 2020

(86) PCT No.: PCT/IN2020/050558
§ 371 (c)(1),
(2) Date: Dec. 27, 2021

(87) PCT Pub. No.: WO2020/261300
PCT Pub. Date: Dec. 30, 2020

(65) Prior Publication Data
US 2022/0246248 A1    Aug. 4, 2022

(30) Foreign Application Priority Data

Jun. 27, 2019 (IN) .............................. 201921025745

(51) Int. Cl.
*G16C 20/10* (2019.01)
*G05B 13/04* (2006.01)
*G16C 20/70* (2019.01)

(52) U.S. Cl.
CPC ........... *G16C 20/10* (2019.02); *G05B 13/048* (2013.01); *G16C 20/70* (2019.02)

(58) Field of Classification Search
CPC .... G16C 20/10; G16C 20/70; G05B 23/0294; G05B 23/0221; G05B 13/048; G06N 20/00
See application file for complete search history.

(56) References Cited

U.S. PATENT DOCUMENTS

| 7,522,963 B2 | 4/2009 | Boyden et al. |
| 8,855,804 B2 | 10/2014 | Hazen et al. |

(Continued)

FOREIGN PATENT DOCUMENTS

CN    104657586    7/2017

OTHER PUBLICATIONS

International Search Report and Written Opinion mailed Jan. 13, 2021, in International Application No. PCT/IN2020/050558; 9 pages.

*Primary Examiner* — Shogo Sasaki
(74) *Attorney, Agent, or Firm* — Finnegan, Henderson, Farabow, Garrett & Dunner, LLP

(57) ABSTRACT

State of the art techniques used for Flue Gas Desulpharization (FGD) process monitoring fail to comprehend the relationship between various process parameters, which is crucial in determining the performance of a FGD process being monitored. The disclosure herein generally relates to industrial process monitoring, and, more particularly, to a method and system for performance optimization of Flue Gas Desulphurization (FGD) Unit. The system identifies Key Performance Indicators (KPIs) associated with the process being monitored, and identifies parameters associated with each KPI. This information is used to generate several predictive models, from which a predictive model having the highest value of composite model score amongst (Continued)

the predictive models is selected as the predictive model for processing the input data, which is then used to perform optimization of the FGD process.

15 Claims, 8 Drawing Sheets

(56) References Cited

U.S. PATENT DOCUMENTS

| | | | |
|---|---|---|---|
| 9,708,960 B2 | 7/2017 | Hall et al. | |
| 10,203,667 B2* | 2/2019 | Escarcega | G05B 13/048 |
| 10,386,827 B2 | 8/2019 | Enver et al. | |
| 10,995,277 B2* | 5/2021 | Cross | C10G 7/10 |
| 11,365,886 B2* | 6/2022 | Faiella | F23D 91/04 |
| 12,021,384 B2* | 6/2024 | Deodhar | G05B 13/048 |
| 2006/0045800 A1 | 3/2006 | Boyden et al. | |
| 2006/0047366 A1* | 3/2006 | Boyden | G05B 13/027 700/266 |
| 2006/0121616 A1 | 6/2006 | Lefebvre et al. | |
| 2009/0149981 A1 | 6/2009 | Evans et al. | |
| 2014/0331752 A1 | 11/2014 | Hall et al. | |
| 2016/0018796 A1* | 1/2016 | Lu | G05B 13/048 700/29 |
| 2016/0018797 A1* | 1/2016 | Lu | H04L 41/0823 700/3 |
| 2018/0341252 A1* | 11/2018 | Lu | G05B 13/048 |
| 2021/0132591 A1* | 5/2021 | Lu | G06N 5/022 |
| 2021/0132596 A1* | 5/2021 | Lu | G06N 5/022 |
| 2021/0255610 A1* | 8/2021 | Webb | G05B 19/41885 |
| 2022/0320861 A1* | 10/2022 | Deodhar | F23K 1/00 |

\* cited by examiner

METHOD AND SYSTEM FOR PERFORMANCE OPTIMIZATION OF FLUE GAS DESULPHURIZATION (FGD) UNIT

PRIORITY CLAIM

The present application is a U.S. National Stage Filing under 35 U.S.C. § 371 and claims priority from International Application No. PCT/IN2020/050558, filed on Jun. 27, 2020, which application claims priority from Indian Patent Application number 201921025745, filed on Jun. 27, 2019. The entire contents of the aforementioned applications are incorporated herein by reference.

TECHNICAL FIELD

The disclosure herein generally relates to industrial process monitoring, and, more particularly, to a method and system for performance optimization of a Flue Gas Desulphurization (FGD) Unit.

BACKGROUND

Flue gas desulphurization (FGD) is the technology used for removing sulphur oxides from flue gases generated from processes like combustion of sulphur in fossil fuels in several industries, especially thermal power plants. It is a complex and dynamic process, and its efficiency and cost of operation depends on multiple parameters of various sub-systems of FGD. Operating costs of FGD include raw materials cost (lime, limestone, etc.), utilities cost (electricity, water, etc.) and other costs related to labor, maintenance, repair and so on.

Current technologies are inadequate to comprehend the relationship between various sub-systems and parameters of the sub-systems associated thereof. Real time measurement of some of the key parameters of the FGD process like limestone slurry concentration and gypsum slurry conversion within the absorber is currently not feasible, although they are crucial in determining the state of FGD. Current systems consider control of only a few parameters (for example, limestone slurry flow rate, pH, and number of pumps to operate, etc.). Furthermore, FGD consists of various equipment, which degrade with time and need continuous monitoring and maintenance. Some equipment are prone to frequent failures and lead to complete shutdown of the plant.

SUMMARY

Embodiments of the present disclosure present technological improvements as solutions to one or more of the above-mentioned technical problems in conventional systems. For example, in one embodiment, a processor implemented method for optimization of a Flue Gas Desulphurization (FGD) process is provided. In this method, a plurality of plant data from an FGD process being monitored are collected as input data, via one or more hardware processors. The input data is then pre-processed. During the pre-processing, one or more unwanted components from the input data are removed via the one or more hardware processors. Further, a dimensionality reduction is performed on pre-processed input data, via the one or more hardware processors. Performing the dimensionality reduction involves two steps. In the first step, a feature selection is performed, wherein the feature selection includes identifying a plurality of important process parameters affecting each of a plurality of Key Performance Indicators (KPIs) of the FGD process, by processing the pre-processed input data. In the second step, a plurality of features are extracted from the data by performing a feature extraction. The dimensionality reduction helps in avoiding processing of the entire data, because processing a part of the input data may not be necessary for the subsequent optimization step. After the dimensionality reduction, a plurality of predictive models is generated based on the plurality of features extracted, for each KPI, via the one or more hardware processors. Further, one of the plurality of predictive models is selected as a predictive model for processing the input data, via the one or more hardware processors. The predictive model may have some unmeasured parameters because certain types of parameters cannot be measured real-time due to practical limitations or due to lack of appropriate sensors. In order to compensate for one or more of the unmeasured parameters, information generated using one or more soft-sensors is used via the one or more hardware processors. An optimization of the FGD process is then performed, via the one or more hardware processors. In the first step of optimization, operation of the FGD process is simulated using the selected predictive model. Simulation of operation of the FGD process includes predicting a plurality of FGD process parameters by the selected predictive model. In the next step, a plurality of optimal set points of operation are estimated from the predicted plurality of FGD process parameters. Further, at least one performance lapse in the FGD process is determined based on the estimated plurality of optimal set points of operation, and then, in response to the determined at least one performance lapse, at least one recommendation is generated to optimize the FGD process.

In another aspect, a system for optimization of a Flue Gas Desulphurization (FGD) process is provided. The system includes one or more hardware processors, a communication interface, and a memory storing a plurality of instructions. The plurality of instructions when executed, cause the one or more hardware processors to collect a plurality of plant data, from an FGD process being monitored, as input data. The input data is then pre-processed by the system. During the pre-processing, one or more unwanted components from the input data are removed by the system. Further, the system performs a dimensionality reduction on pre-processed input data, via the one or more hardware processors. Performing the dimensionality reduction involves two steps. In the first step, a feature selection is performed, wherein the feature selection includes identifying a plurality of features affecting each of a plurality of Key Performance Indicators (KPIs) of the FGD process, by processing the pre-processed input data. At a second step, the plurality of features are extracted by performing a feature extraction. The dimensionality reduction helps in avoiding processing of the entire data, which may be unnecessary as processing a part of the input data may not be necessary for the optimization step. After the dimensionality reduction, the system generates a plurality of predictive models based on the plurality of features extracted, for each KPI, via the one or more hardware processors. Further, the system selects one of the plurality of predictive models as a predictive model for processing the input data, via the one or more hardware processors. The predictive model may have some unmeasured parameters because certain type of parameters cannot be measured due to practical limitations. In order to compensate for one or more of the unmeasured parameters, the system uses information generated using one or more soft-sensors. The system then performs an optimization of the FGD process, via the one or more hardware processors. In the first step of optimization, the system simulates operation of the FGD process, using the selected predictive model. Simulation of operation of the FGD process includes predicting a plurality of FGD process parameters by the selected predictive model. In the next step, the system estimates a plurality of optimal set points of operation, from the predicted plurality of FGD process parameters. Further, the system determines at least one performance lapse in the FGD process based on the estimated plurality of optimal set points of operation, and then in response to the determined at least one performance lapse, at least one recommendation is generated to optimize the FGD process.

In yet another aspect, a non-transitory computer readable medium for optimization of a Flue Gas Desulphurization (FGD) process is provided. A plurality of instructions, stored in a memory (storage unit), form the non-transitory computer readable medium. The plurality of instructions in the non-transitory computer readable medium, when executed, cause one or more hardware processors of a system in which the non-transitory computer readable medium is stored, to execute the following steps to perform the optimization of the FGD process. In this method, a plurality of plant data from a FGD process being monitored are collected as input data, via one or more hardware processors. The input data is then pre-processed. During the pre-processing, one or more unwanted components from the input data are removed via the one or more hardware processors. Further, a dimensionality reduction is performed on pre-processed input data, via the one or more hardware processors. Performing the dimensionality reduction involves two steps. In the first step, a feature selection is performed, wherein the feature selection includes identifying a plurality of features affecting each of a plurality of Key Performance Indicators (KPIs) of the FGD process, by processing the pre-processed input data. In the second step, the plurality of features are extracted by performing a feature extraction. The dimensionality reduction helps in avoiding processing of the entire data, which may be unnecessary for the optimization step. After the dimensionality reduction, a plurality of predictive models are generated based on the plurality of features extracted, for each KPI, via the one or more hardware processors. Further, one of the plurality of predictive models is selected as a predictive model for processing the input data, via the one or more hardware processors. The predictive model may have some unmeasured parameters, as certain type of parameters cannot be measured due to practical limitations. In order to compensate for one or more of the unmeasured parameters, information generated using one or more soft-sensors is used via the one or more hardware processors. An optimization of the FGD process is then performed, via the one or more hardware processors. In the first step of the optimization, operation of the FGD process is simulated using the selected predictive model. Simulation of operation of the FGD process includes predicting a plurality of FGD process parameters by the selected predictive model. In the next step, a plurality of optimal set points of operation are estimated from the predicted plurality of FGD process parameters. Further, at least one performance lapse in the FGD process is determined based on the estimated plurality of optimal set points of operation, and then in response to the determined at least one performance lapse, at least one recommendation is generated to optimize the FGD process.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
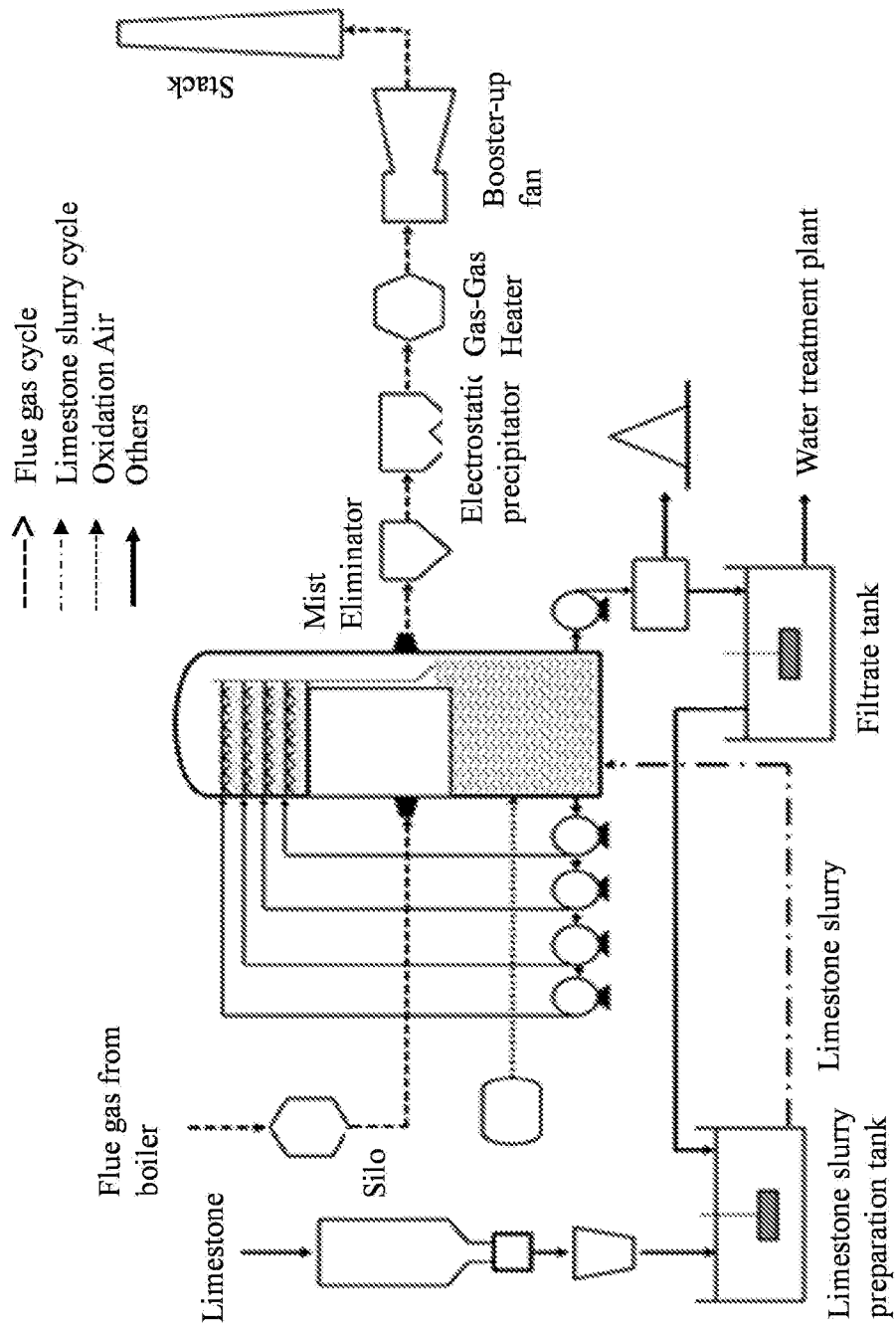
FIG. 1 is a process flow diagram of a Flue Gas Desulpharization (FGD) plant, being monitored by the system of FIG. 2A, for FGD, according to some embodiments of the present disclosure.

An example illustration of the FGD process is depicted in FIG. 1. As depicted, the process includes multiple sub systems like exhaust gas system (Booster Up Fan (BUF), Gas-Gas Reheater (GGH), etc.), limestone slurry preparation unit, absorption tower, gypsum recovery unit, water treatment unit, and so on. The schematic shown is a typical layout of flue gas desulphurizer, the configuration and layout may change for different units. The flue gas generated from any fossil fuel combustion unit like a boiler, contains a large amount of Sulphur Oxides (SOx) varying typically in the range 100-1200 ppm depending on the amount and type of coal used. Flue gas might be passed through Gas-Gas Heater (GGH) to extract excessive heat. It also helps to bring down the temperature, favorable for absorption. The absorption tower, a long vertical column, situated after GGH, can be divided into two zones, absorption zone and tank zone. Flue gas is passed to absorption tower through flue gas inlet duct located above tank zone. The flue gas flows upwards, intermingles with limestone slurry sprayed through a nozzle to absorb SOx in the flue gas, and forms calcium bisulphate. This slurry falls in tank area, which is again injected into the absorption area at different elevations through a combination of recirculation pumps. The level from which the mixture is sprayed significantly affects the efficiency of desulphurization process. The tank area, designed to store limestone slurry for sufficient retention time helps in optimum consumption of limestone, oxidation (air is passed through a blower) and crystallization to gypsum. Thus, the gypsum formed is extracted from the bottom of the tower. It is desiccated in a dehydrator to obtain solid gypsum.

Further, a FGD unit has a fresh limestone slurry preparation unit. Solid limestone stored in a silo is fed to the limestone slurry preparation tank after grinding it into fine particles. Water is mixed in appropriate proportion to maintain the required concentration of limestone slurry. Fresh limestone slurry is injected in optimum amount to replenish limestone needed inside the absorption tower. It also helps to maintain desired pH inside the tower.

Clean flue gas exits absorption tower through the outlet duct located in the middle. At the other end of absorption tower, flue gas is passed through a mist eliminator to remove moisture. Suspended dust particles are removed using an electrostatic precipitator. Flue gas undergoes significant pressure drop when it passes through various processes. Booster Up Fan (BUF) is employed to increase flue gas pressure to enable its flow up to the chimney and discharge to the environment.

It is to be noted that even though working of the system 100 is explained with reference to performance monitoring and optimization of the FGD process, the method disclosed herein may be generalized to perform monitoring and optimization of any other industrial process.

Referring now to the drawings, and more particularly to FIG. 2A through FIG. 6, where similar reference characters denote corresponding features consistently throughout the figures, there are shown preferred embodiments and these embodiments are described in the context of the following exemplary system and/or method.

Figure 2A:
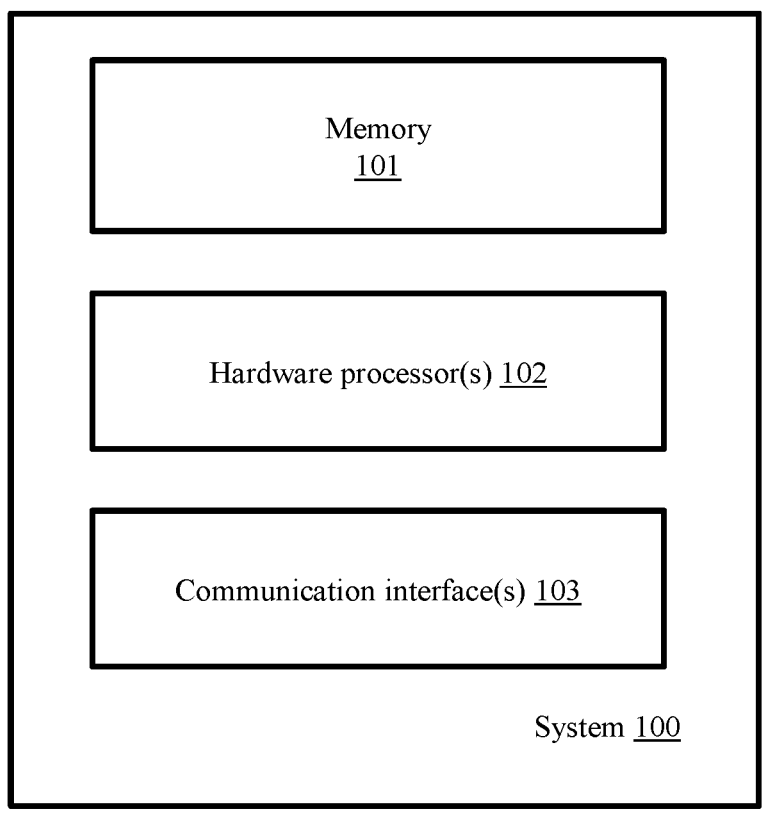
FIG. 2A illustrates an exemplary system for performance optimization of Flue Gas Desulphurization (FGD), according to some embodiments of the present disclosure.

FIG. 2A illustrates an exemplary system 100 for performance optimization of Flue Gas Desulphurization (FGD), according to some embodiments of the present disclosure. The system 100 includes a memory 101, one or more hardware processor(s) 102, and communication interface(s) 103.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the hardware processor(s) 102 are configured to fetch and execute computer-readable instructions stored in the memory 101, which causes the hardware processor(s) 102 to perform actions depicted in FIG. 3 for the purpose of detecting impurities. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. For data transfer, the communication interface(s) 103 may use any suitable protocol such as but not limited to OPC UA, OPC DA, TCP/IP, and MODBUS. The communication interface(s) 103 may also use appropriate Application Programming Interfaces (APIs) for the data transfer.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 101 stores a plurality of instructions which when executed, cause the one or more hardware processors 102 to perform one or more actions and corresponding the FGD optimization being handled by the system 100, during which the system 100 monitors working of an FGD process similar to the one depicted in FIG. 1, collects various real-time and non-real-time data (also referred to as 'plant data') from the FGD process, and optimizes working of the FGD process. Various steps executed by the system 100 during the FGD optimization are explained with description of FIG. 3A to FIG. 6.

Figure 2B:
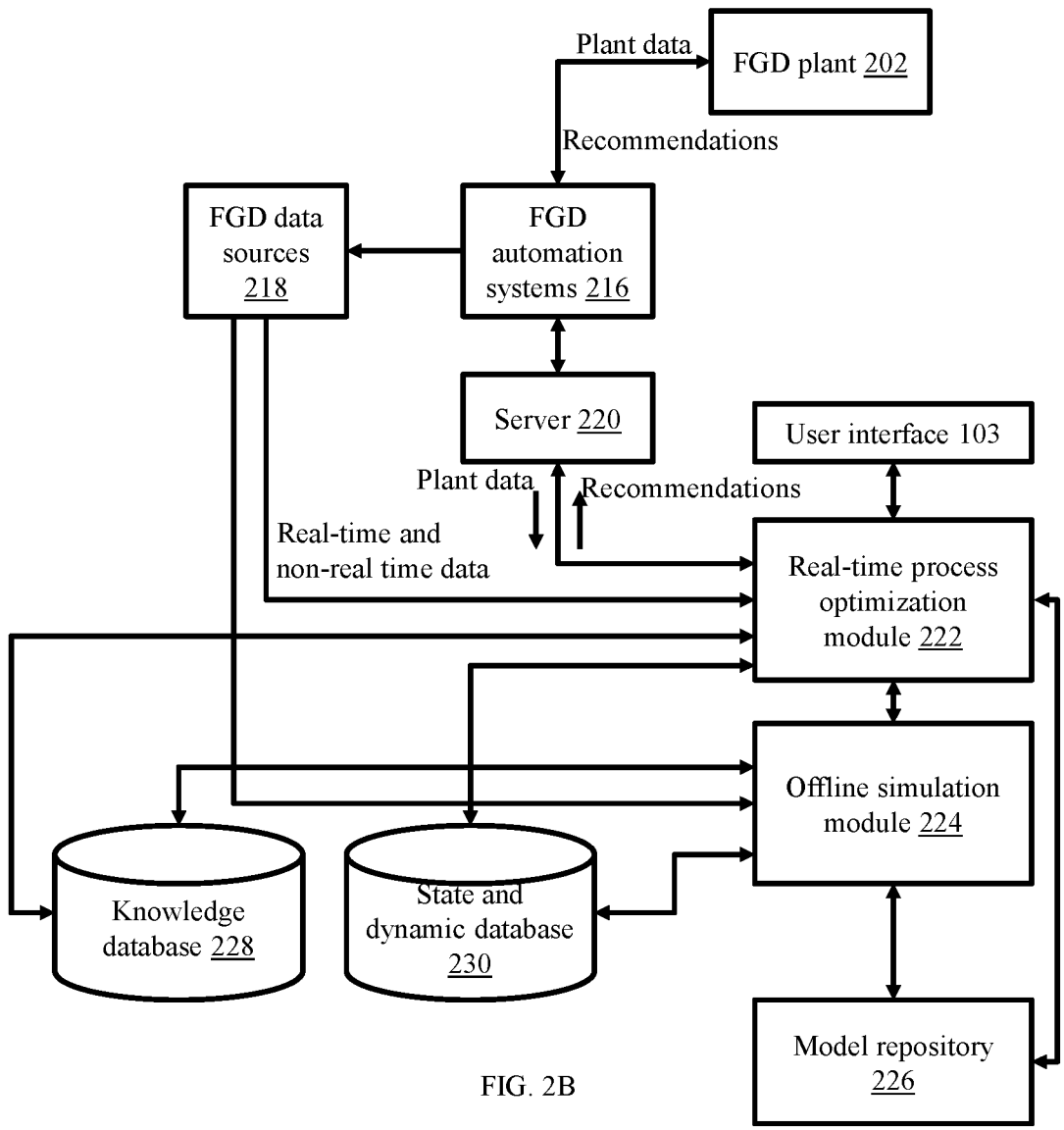
FIG. 2B is an example architecture diagram of the system of FIG. 2A in a real-time FGD plant monitoring and process optimization scenario, according to some embodiments of the present disclosure.

According to an embodiment of the disclosure, an example implementation of the system 100 to monitor and perform optimization of a Flue Gas Desulphurization (FGD) process in an FGD plant/unit is shown in the block diagram of FIG. 2B. The system 100 includes a plurality of sensors (not shown in figure) that are used to monitor and measure various parameters in the FGD plant, and this data are together termed as 'plant data', FGD automation systems 216, FGD data sources 218, a server 220, a real-time process optimization module 222, an offline simulation module 224, a model repository 226, a knowledge database 228 and static and dynamic databases 230. It should be appreciated that the model repository 226, the knowledge database 228 and static and dynamic databases 230 could be part of the memory 101.

According to an embodiment of the present disclosure, flow diagram of the FGD process is depicted in FIG. 1 and working of the FGD process is explained as description of FIG. 1. Various data from the FGD process 202 (shown in FIG. 1) are collected by the system 100, as real-time data, which are then processed by the system 100 to generate the recommendations.

According to an embodiment of the disclosure, referring to FIG. 2B, the static databases of the static and dynamic databases 230 store data and information that do not vary with time such as materials database that consists of static properties of raw materials, byproducts and end-products, emissions, and so on, an equipment database that consists of equipment design data, details of construction materials, and so on, and a process configuration database that consists of process flowsheets, equipment layout, control and instrumentation diagrams, etc. Also, Static database constitute of an algorithm database consisting of algorithms and techniques of data-driven, physics-based and hybrid models, and solvers for physics-based models, hybrid models and optimization problems.

Further, the dynamic databases of static and dynamic databases 230 include data and information that are dynamic in nature and are updated either periodically or after every adaptive learning cycle. Dynamic databases include an operations database that consists of process variables, sensor data, a laboratory database that consists of properties of raw materials, byproducts and end-products obtained via tests at the laboratories, a maintenance database that consists of condition of the process, health of the equipment, maintenance records indicating corrective or remedial actions on various equipment, etc., an environment database that consists of weather and climate data such as ambient temperature, atmospheric pressure, humidity, dust level, and so on.

According to an embodiment of the disclosure, referring to FIG. 2B, the knowledge database 228 includes knowledge derived while running real-time process optimization module 222 and is potentially a useful information to be used at any later stage of operation. This also includes the key performance curves derived from historical data using multitude of offline simulation using offline simulation module 224, which are used by the system 100 to generate one or more recommendations. The Knowledge database 228 also includes information related to the performance of various algorithms stored in the static database. In an embodiment, if the system 100 is configured to host multiple algorithms and select and use an algorithm that matches specific characteristics of data collected in real-time, or based on a recorded previous performance of the algorithm, and use the selected algorithm for further data processing.

Further, the offline simulation module 224 performs simulation tasks on the FGD process that are not required or not possible in real-time owing to the complexity of the system but are useful to be performed at regular intervals. The offline simulation module 224 generates specific test instances for simulation that are simulated using high fidelity physics-based models and data-driven models. These modules provide insights into overall operation of the FGD process 202 (shown in FIG. 1). The offline simulation module 224 interacts with the static and dynamic databases 230, the knowledge database 228 and the model repository 226 to perform certain simulations. It also interacts with the real-time process optimization module 222 to receive information and simulation requests, and returns the simulation results and insights based on offline simulations for the system 100 to perform the process optimization.

The outputs of various modules are shown to the user via the user interface 103. The recommendations from the system 100 include optimal settings of various components of the FGD process 202 (FIG. 1).

Figure 3A:
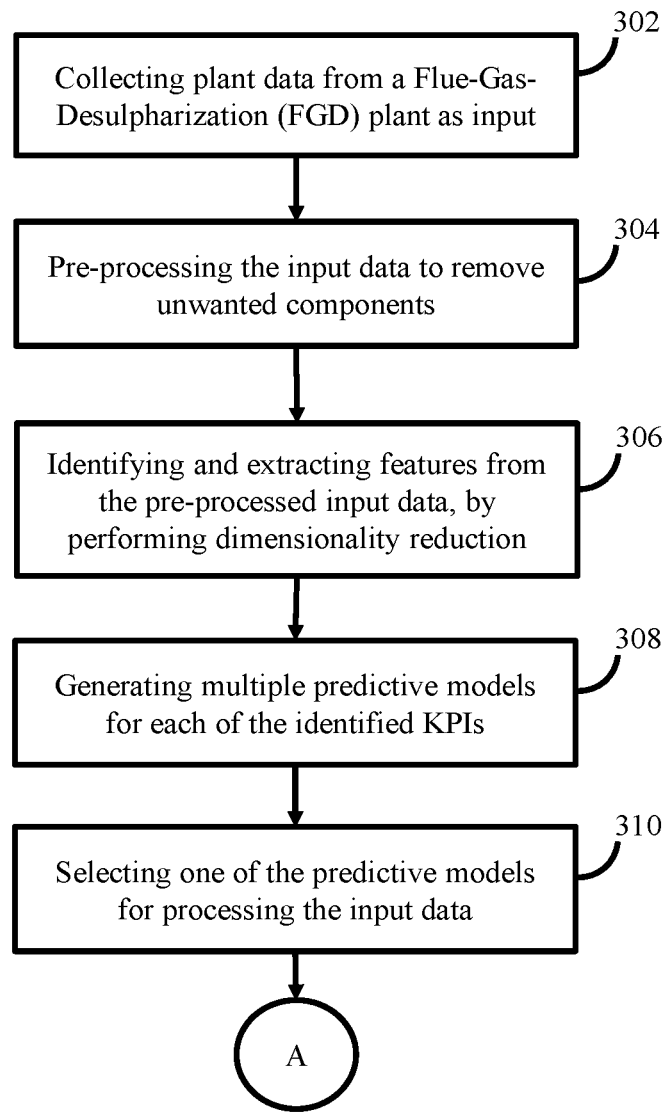
FIGS. 3A and 3B (collectively referred to as FIG. 3) is a flow diagram depicting steps involved in the process of performance optimization of Flue Gas Desulphurization (FGD) process using the system of FIG. 2, according to some embodiments of the present disclosure.
Figure 3B:
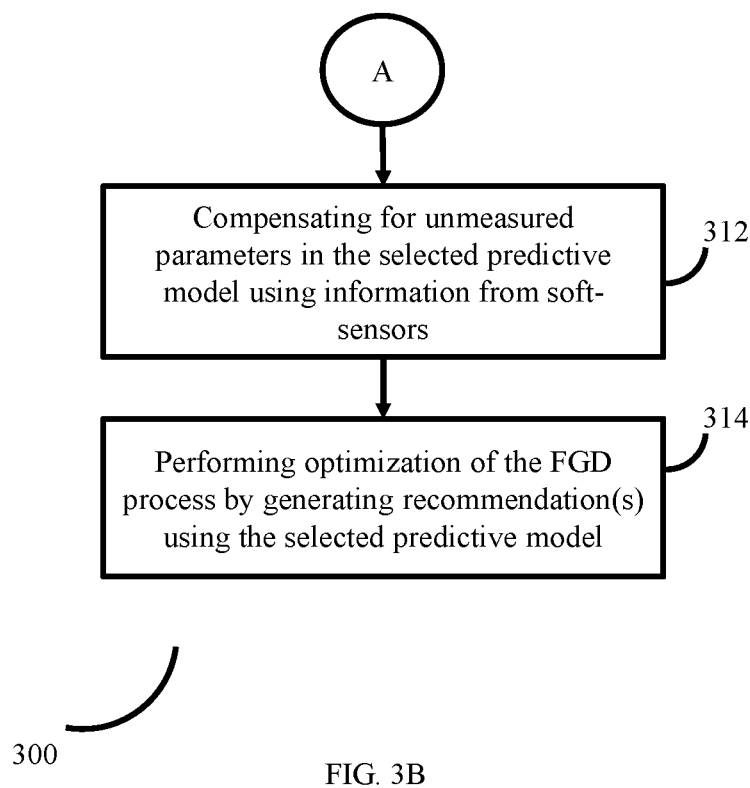
Figure 4:
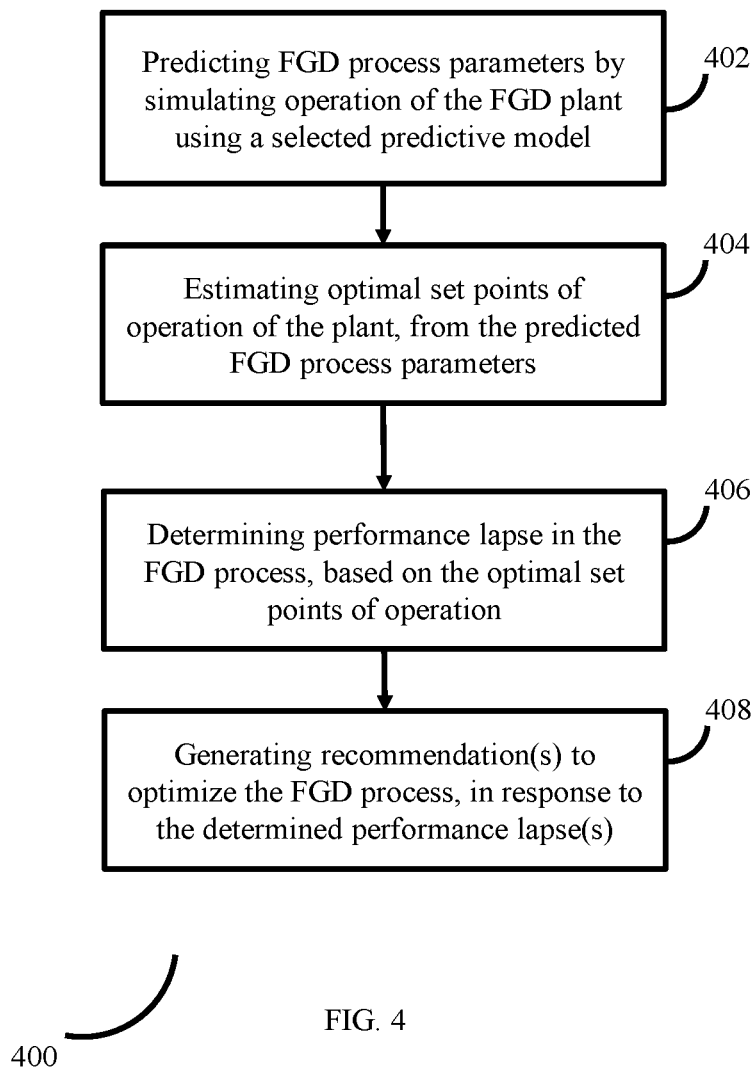
FIG. 4 is a flow diagram depicting steps involved in the process of optimizing FGD process using the system of FIG. 2, according to some embodiments of the present disclosure.
Figure 5:
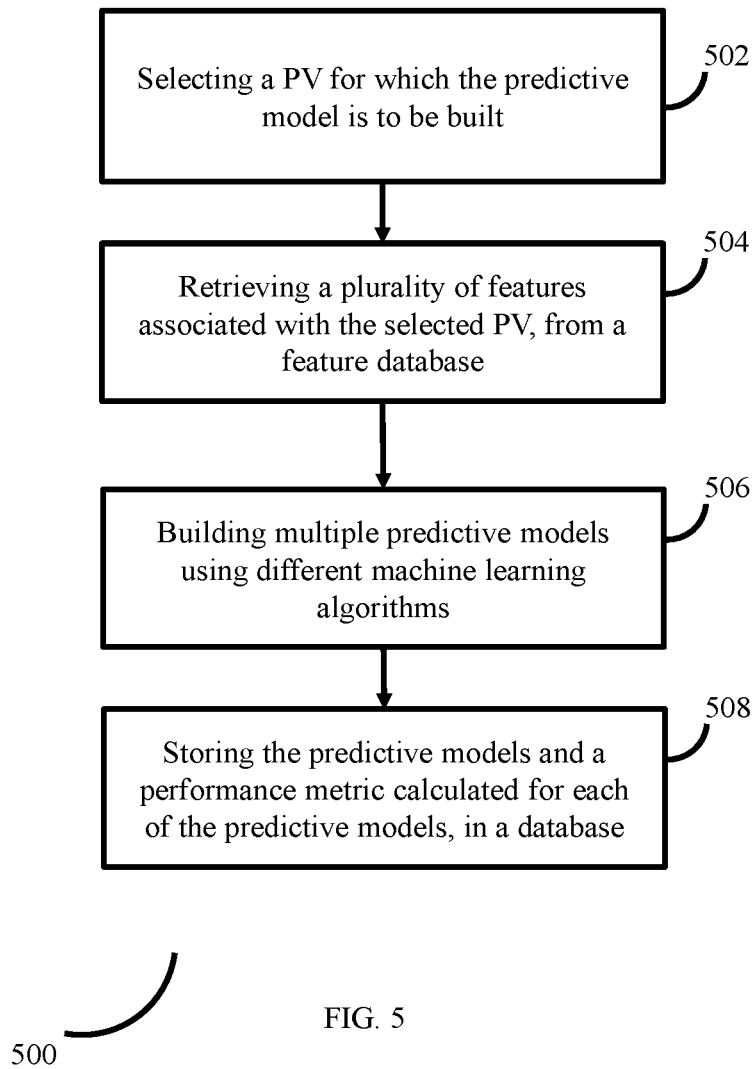
FIG. 5 is a flow diagram depicting steps involved in the process of generating predictive models using the system of FIG. 2, according to some embodiments of the present disclosure.
Figure 6:
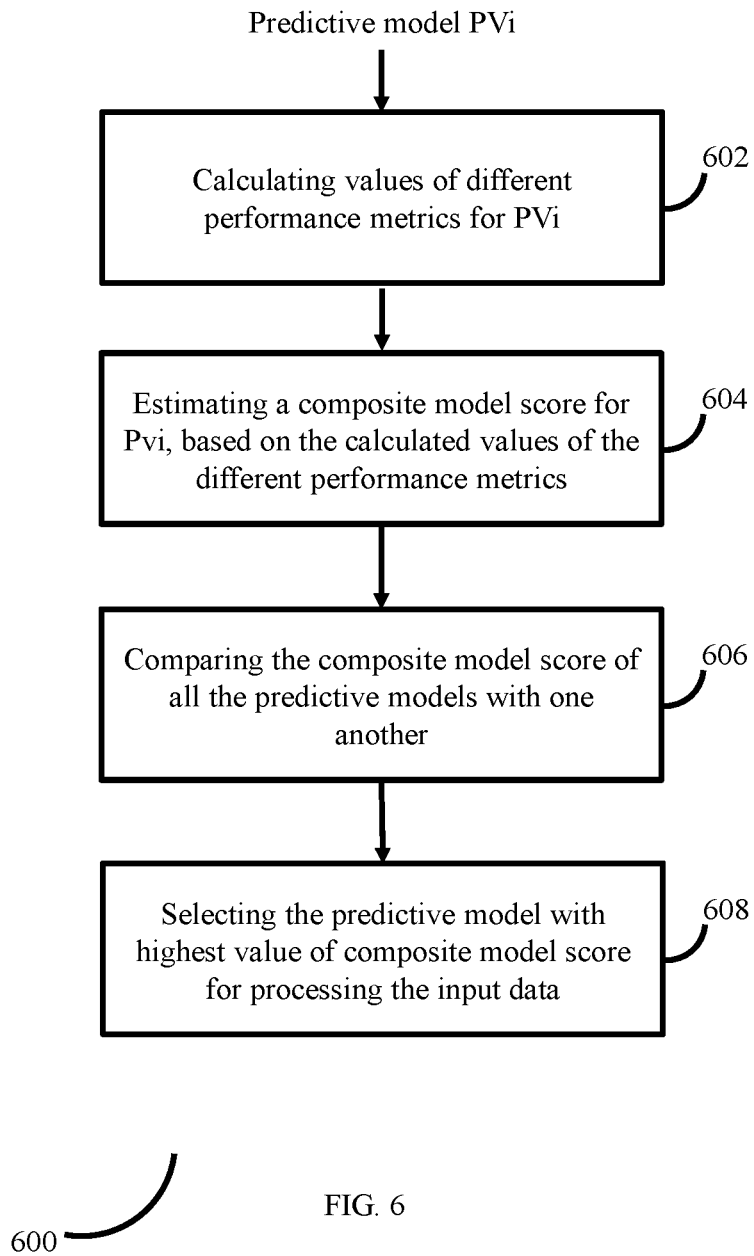
FIG. 6 is a flow diagram depicting steps involved in the process of selecting a predictive model for processing input data, from among the plurality of predictive models, using the system of FIG. 2, according to some embodiments of the present disclosure.

FIGS. 3A and 3B (collectively referred to as FIG. 3) is a flow diagram depicting steps involved in the process of performance optimization of Flue Gas Desulphurization (FGD) process using the system of FIG. 2, according to some embodiments of the present disclosure. The system 100 uses a plurality of sensors (such as temperature sensor, pressure sensor and so on) of appropriate type to collect (302) data pertaining to different parameters (for example, measured value of temperature, pressure and so on) associated with a plurality of subsystems of the plant being monitored, as input. The terms 'data' as well as 'input data' are used interchangeably throughout the specification and claims. The system 100 may select and use appropriate sensors, based on type of parameter to be monitored. The system 100 may collect historic data as well, with respect to the processes being monitored, from one or more databases. The one or more databases may be internal or external to the system 100.

The system 100 then conditions (304) the data by pre-processing the collected data. The system 100 may use any appropriate method for pre-processing the data, so as to remove any unwanted components from the input data. For example, the system 100 uses data processing method explained in Indian patent application No. IN201621035461 to pre-process and condition the data. During the pre-processing of the data, the system 100 initially uses a data filtering method to remove parameters with high missing percentage and low interquartile range from the data. Filtered data after this step is then subject to an outlier analysis during which outliers in the filtered data are decided based on the domain knowledge and one or more appropriate machine-learning methods. After removing the outliers, different variables in the data are categorized based on the availability of the data. Further, from this data, different parameters are chosen for further analysis, by performing a pattern analysis. At this stage, missing values are replaced by new values estimated using a multivariate imputation process, and an imputed data at output of this step is subject to clustering where the data are segregated into multiple clusters based on various regimes of operation. Based on number of observations and points in each cluster, different steps in the pre-processing stage may be iterate further, to generate the conditioned data. Such an approach may be followed by the system 100 to remove the unwanted components, wherein the term 'unwanted components' may refer to information that are part of the input data, which are not required for the system 100 to perform the monitoring and optimization of the FGD process.

During the pre-processing, the data is subject to data filtering by the system 100, during which parameters with high missing percentage and low interquartile range from the data are removed. The filtered data is passed through an outlier analyzer (not shown) of the system 100 where outliers are decided based on the domain knowledge and various machine-learning methods. After outliers removal, the variables are categorized based on the availability of the data and these are linked with the missing pattern analysis where the significant parameters are chosen for further analysis. The missing values are replaced by new values estimated using multivariate imputation. The imputed data are then subject to clustering by the system 100 where data are segregated into multiple clusters based on various regimes of operation. Based on the number of observations and points in each cluster, the framework decides to or iterate further. Final pre-processed data is stored an appropriate database in the memory 101, as conditioned data.

The system 100 further measures (306) Process Variables (PV) from the conditioned data, by performing a dimensionality reduction. The conditioned data in the memory 101 may include larger number of features, many of which may or may not be significant/required in subsequent analysis. The dimensionality reduction is performed to reduce the number of features. Based on presence of noise in the pre-processed data, either of a feature selection or a feature extraction is triggered, so as to perform the dimensionality reduction. Feature selection is the process of finding relevant features which can explain the variability and trend of various Key Performance Indicators (KPIs) in the data. At this stage, physics and domain knowledge from the plant may be used as an input for validating the features selected using the machine learning method(s). Additionally, in case, some important features are missed by the machine learning/statistics based feature selection techniques, the system 100 can be configured to provide appropriate interface(s) to manually add these features for further analysis. If feature extraction is selected, it transforms the input data into features with distinct properties of an input pattern by transforming the input data into a low dimensional space. The feature selection or extraction are done individually or jointly for each identified KPIs whose predictive models are required to be built. The estimated features after dimensionality reductions are stored in the memory 101.

The system 100 then categorizes the selected parameters into two groups: 'input or independent variable' and 'output or response variables'. The output or response variables are mainly KPIs or process variables (PVs) which represent a running state of the FGD plant and in turn the FGD process being monitored. The input variables are further classified into manipulated variables (MVs) and disturbance variables (DVs). MVs can be adjusted by a control system (not depicted in FIG. 1) of the FGD plant by one or more plant operators, to bring desirable effects in the PVs. Disturbance Variables also affect PVs but cannot be controlled or adjusted.

The system 100 then identifies multiple process variables associated with the FGD process. In an embodiment, the system 100 identifies the process variables based on inputs from subject matter experts, which the system 100 may receive/collect by providing appropriate user interface(s). A few examples of such process variables are, but not limited to, chimney inlet sulphur dioxide ($SO_2$) concentration, absorption tower level, absorption tower pH, booster upper fan power consumption, limestone slurry concentration inside tower, and gypsum conversion. Using this information (process variables), the system 100 builds predictive models for each of these PVs.

The system 100 then builds (308) multiple predictive models, for each of the identified PVs, involving the following steps. The system 100 uses different machine learning (ML) or deep learning (DL) techniques, for building the predictive models. Measured process parameters for which predictive models need to be built are identified. Consider that 'n' number of process variables have been identified as $PV_1, PV_2, PV_3 \ldots PVn$. They could be chimney inlet $SO_2$ concentration, absorption tower level, absorption tower pH, booster up fan power consumption or any other parameter.

After selecting a process variable PVi, the system 100 retrieves (504) all the features associated with the selected PVi. In an embodiment, the features associated with each of the PVis are configured with the memory 101. The system 100 then fetches the pre-processed data stored in the memory 101. The system 100 then uses the retrieved features and preprocessed data to build (506) the predictive models, using different machine learning techniques. For example, consider that T number of various machine learning techniques are identified, then total 'j' number of predictive models are built for PVi. The predictive models built for each PVi are then stored (508) in one or more databases in memory 101. The system 100 also calculates performance metrics of each of the predictive models, and stores in the database. The system 100 uses this approach to build predictive models for all the PVis.

The system 100 then selects (310) one of the predictive models, from the multiple predictive models built at step 308, so as to select the input data. Selection of the predictive model from among the predictive models involves the following steps. For each of the $PV_{i,s}$, and for the corresponding models, the system 100 calculates or retrieves (602) different performance metrics of each of these predictive models, which include accuracy, robustness and sensitivity of the models. The system 100 then estimates (604), for each of the predictive models, a composite model score by taking weightage average of accuracy, robustness and sensitivity is calculated. Model score ($MS_{ij}$) for process variable $PV_i$ and machine learning technique $ML_j$ can be calculated as $MS_{ij} = a_i Acc_{ij} + bi R_{ij} + ci S_{ij}$. Weights $a_i$, $b_i$, $c_i$ are decided based on domain knowledge from subject matter expert and metrics of accuracy, robustness and sensitivity have been chosen. The predictive model $ML_{ij}$ with best score $MS_{ij}$ is selected as best model $ML_i$ and stored in best model storage unit. This process is iterated for all process variables $PV_i$. The system 100 then compares (606) the composite model score of each of the predictive models with that of each of the other predictive models. By comparing the composite model scores of the predictive models, the system 100 identifies and selects (608) the predictive model having the highest value of the composite model score amongst the predictive models as the predictive model for processing the input data.

As explained, each of the predictive models is built using information on different types of parameters associated with the FGD process, extracted from the collected plant data. However, there may be certain parameters that cannot be measured directly from the plant data using sensors. Such parameters are referred to as 'unmeasured parameters'. For example, few of the significant process variables, such as limestone slurry concentration inside tower, gypsum conversion inside absorption tower and so on, cannot be measured due to certain hardware limitations. The system 100 uses operational data combined with physics of the process to estimate these variables. Such estimated variables are termed as soft sensors. The soft sensors provide real time estimation in coherence with other measured variables. Information from such soft sensors are used to compensate for/replace (312) the unmeasured parameters/data i.e. the data/parameters that cannot be directly measured, in the predictive model.

One or more soft sensor models used for generating the soft sensors may take following inputs: temperature, pressure, concentration and flow rate of inlet flue gas to the tower; temperature, pressure, concentration and flow rate of outlet flue gas from the tower; concentration, flow rate and particle size distribution of fresh limestone slurry fed in the tower; concentration, composition, flow rate and particle size distribution of recirculation limestone through pumps; temperature and flow rate of all inlet water, temperature, pressure and flow rate of air used for oxidation; temperature, concentration, composition and flow rate of gypsum purged from absorption tower; and absorber dimensional parameters like height of each zone and diameter. Apart from various data, the soft sensor model interacts with physics based models such as but not limited to heat transfer models, mass transfer models, and fluid dynamics models and reaction kinetics of the system developed for simulation. The soft sensor models developed give real time estimation of significant process variables, such as limestone slurry concentration inside tower and gypsum conversion inside the tower. The soft sensors developed are stored in the memory 101, and may be accessed by the system 100 for process optimization. Depending on the type of unmeasured data, appropriate soft sensors and physics based models can be used to generate data/information that can be used to compensate for the unmeasured data in the data model.

The selected predictive model is then used by the system 100 to process the input data, so as to perform optimization of the FGD process. The selected predictive model simulates (402) operation/working of the FGD process, and predicts a plurality of process parameters associated with the FGD process being simulated. The 'simulation' involves the selected predictive model mimicking working/operation of the FGD process. The system 100 then estimates (404) a plurality of optimal set points of operation of the plant, from the predicted FGD process parameters. The system 100 then determines (406) performance lapse in the FGD process, based on the optimal set points of operation. Further, in response to the determined performance lapse(s), the system 100 generates (408) one or more recommendations, which, when executed, solves the determined performance lapse(s). Steps involved in the process of FGD process optimization being carried out by the system 100 are explained below:

The optimization is done considering a horizon of time between present instant t and next instant t+1. The time-step between two periods is denoted as $\Delta t=(t+1)$ t. Input of all predefined DVs in real time are taken for the process optimization. Various DVs have been denoted as $DV_1(t)$, $DV_2(t), \ldots, DV_p(t)$. Here t denotes the present timestamp. Further, the various predictive models $ML_1, ML_2, \ldots, ML_n$ are retrieved from best model storage. These are used to forecast various PVs $PV_1(t+1), PV_2(t+1), \ldots, PV_n(t+1)$. Similarly, soft-sensors stored in soft sensor storage unit are used to make real time estimation of limestone slurry concentration inside tower and gypsum conversion inside tower.

The optimization is governed by constraints, rules, and bounds. A cost function further considers costs of various levers, for example: limestone cost, power consumed by recirculation pumps, power consumed by booster up fans and so on. Total cost is calculated for a time horizon $\Delta t$, which is minimized during optimization. Various PVs forecasted for next steps are used to satisfy various operational constraints. Any constraint $C_i$ is a function of $PV_1(t+1)$, $PV_2(t+1), \ldots, PV_n(t+1), MV_1(t), MV_2(t), \ldots, MV_m(t)$. Each constraint $C_i$ has a lower bound $C_{il}$ and upper bound $C_{iu}$. For example, a process variable FGD outlet SOx concentration should be less than $Y_1$ ppm. Similarly, absorption tower liquid height should be in a set range (for example, more than $L_1$ m and less than $L_2$ m). At the same time, some rules have been specified for better and smooth operation of the plant. For example, time interval between two recirculation pumps to switch on should be minimum $\tau_0$ minutes.

As part of the optimization, the system 100 suggests an optimal set points of various MVs i.e. $MV_1(t)$, $MV_2(t), \ldots, MV_m(t)$. A few examples of such MVs are limestone slurry flow rate, limestone slurry concentration, air flow for oxidation, gypsum purging, number of recirculation pumps, and elevation of spray for the pumps and so on. These set points are estimated real time and continuously pushed to the plant at predefined interval.

The predictive models developed using data may deteriorate over time due to various factors like changes in plant due to maintenance activities, changes in equipment, ageing of plant, change in the operating regime of the plant, sensor malfunctioning and so on. Hence, it is necessary to continually monitor the performance of these predictive models. The predicted values from various predictive models are validated against the real time sensor values continuously by the system 100. Each of the models is given a health score based on its performance in a selected period of time. The term "health score" of a predictive model indicates/represents accuracy with which the predictive model predicts values of different operational parameters associated with the FGD process, which may be determined as a percentage match between the predicted values and the real-time values from the sensors. If any of the predictive models is identified as having a health score below a pre-defined threshold of health score, the system 100 uses a self-learning approach which allows the predictive model to self-update and make appropriate corrections to the predictive model, using data collected over a period of time. Here the term 'correction' refers to the process of updating the model, which allows the predictive model to generate more accurate predictions.

The system 100 further performs equipment monitoring so as to identify/detect one or more equipment in the plant which may be prone to sudden failure and breakdown, which in turn may lead to complete shutdown of the plant. The system 100 uses the method 300 to generate predictive models for one or more equipment in the FGD plant. The predictive models generated for the equipment may be termed as "equipment-monitoring models", and may be stored in the memory 101. The system 100 processes the equipment-monitoring model of each of the equipment being monitored, so as to assess/monitor the working condition of the equipment. In an embodiment, data in the equipment-monitoring model of any equipment, at a given point of time, can simulate working/operation of the equipment, which when analyzed, provides information on various operational characteristics of the equipment, to the system 100. The various operational characteristics can together represent the working condition of the equipment. The system 100 may have stored in the memory 101, one or more 'working models' of the equipment, wherein each of the one or more working models represents an expected/fault-free operation of the equipment. By comparing the equipment-monitoring model with one or more of the working models, the system 100 checks for any deviation in the equipment-monitoring model in comparison with the one or more working models. Any deviation, exceeding a threshold of deviation, may indicate/represent a faulty operation of the equipment or may indicate that the equipment is susceptible to failure. If any fault is noticed, the system 100 may generate an alarm so as to alert a user about a potential equipment failure. The alarm generated may be of any pre-configured type. For example, the system 100 may display an error message of a specific format, on a display interface associated with the communication interface(s) 103 of the system 100. In another example, a message (for example, in SMS or MMS format) may be sent to personal mobile phones of one or more users.

The system 100 may also perform a root cause analysis on the issue/fault for determining cause(s) of the detected faulty operation. The system 100 may also estimate a remaining useful life (RUL) of the equipment/plant, by processing real-time data collected from the equipment. The system 100 may use any suitable state of the art approach for the root-cause analysis and to estimate the RUL. Based on the root cause analysis of the equipment failure, various conditions in the one or more equipment-monitoring models may get altered as the working conditions of the plant gets changed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of Flue gas desulphurization (FGD) monitoring. The embodiment, thus provides a mechanism to simulate working of various subsystems of FGD and performance assessment.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method for optimization of a Flue Gas Desulphurization (FGD) process, comprising:
   collecting a plurality of plant data using a plurality of sensors, from a FGD process being monitored, as input data, via one or more hardware processors, wherein the plurality of plant data comprises real-time and non-real-time data;
   pre-processing the input data, comprising removing one or more unwanted components from the input data via the one or more hardware processors;
   performing a dimensionality reduction on pre-processed input data, via the one or more hardware processors, comprising:
      performing a feature selection, wherein the feature selection comprising identifying a plurality of features affecting each of a plurality of Key Performance Indicators (KPIs) of the FGD process, from the pre-processed input data, wherein the plurality of KPIs are a plurality of Process Variables (PVs) representing a running state of the FGD plant and in turn the FGD process being monitored, and wherein the plurality of PVs comprise chimney inlet Sulphur dioxide ($SO_2$) concentration, absorption tower level, absorption tower pH, booster upper fan power consumption, limestone slurry concentration inside tower, and gypsum conversion; and
      extracting the plurality of features by performing a feature extraction;
   generating a plurality of predictive models based on the plurality of features extracted, for each KPI, via the one or more hardware processors;
   selecting one of the plurality of predictive models as a predictive model for processing the input data, via the one or more hardware processors;
   compensating for one or more unmeasured parameters of the selected predictive model using information generated using one or more soft-sensors, via the one or more hardware processors, wherein the one or more unmeasured parameters comprise one or more PVs among the plurality of PVs;
   performing the optimization of the FGD process, via the one or more hardware processors, comprising:
      simulating the operation of the FGD process using the selected predictive model, comprising predicting a plurality of FGD process parameters by the selected predictive model;
      estimating a plurality of optimal set points of operation, in real time, from the predicted plurality of FGD process parameters;
      determining at least one performance lapse in the FGD process, based on the estimated plurality of optimal set points of operation; and
      generating at least one recommendation to optimize the FGD process, in response to the determined at least one performance lapse, wherein the at least one recommendation comprise an optimal set points of a plurality of Manipulated Variables (MVs) of the FGD plant, wherein the plurality of MVs comprise limestone slurry flow rate, limestone slurry concentration, air flow for oxidation, gypsum purging, number of recirculation pumps, and elevation of spray for the pumps, and wherein the plurality of MVs are adjusted by a control system of the FGD plant to bring desirable effects in the plurality of PVs;

continuously pushing the optimal set points of the plurality of MVs into the FGD plant at predefined time intervals to optimize operation of the FGD process; and detecting deviation in working of one or more equipment in the FGD plant by comparing the selected predictive model with one or more working models of the one or more equipment, wherein upon detecting deviation an alarm is generated to alert a user about a potential equipment failure.

2. The processor implemented method as claimed in claim 1, wherein selecting the predictive model from the plurality of predictive models, comprising:
calculating values of different performance metrics of the plurality of predictive models;
estimating a composite model score of each of the plurality of predictive models, for a given test dataset;
comparing the estimated composite model score of each of the plurality of predictive models with estimated composite model score of each of the other predictive models; and
selecting a predictive model having the highest value of the composite model score amongst the plurality of predictive models, as the predictive model for processing the input data.

3. The processor implemented method as claimed in claim 1, wherein the selected predictive model generates a plurality of FGD process parameters while simulating the operation of the FGD process.

4. The processor implemented method as claimed in claim 1, wherein performance of the selected predictive model is validated, comprising:
estimating the error in prediction of the plurality of FGD process parameters for the selected predictive model;
calculating a health score of the selected predictive model, based on the estimated error in prediction of the plurality of FGD process parameters;
comparing the calculated health score with a threshold of health score; and
correcting the selected predictive model if the calculated health score exceeds the threshold health score.

5. The method as claimed in claim 1, wherein an equipment monitoring is performed using one or more of the predictive models, comprising:
monitoring at least one equipment in the FGD process for a faulty operation, based on data from at least one predictive model of the at least one equipment, via the one or more hardware processors;
generating an alarm if at least one instance of the faulty operation is detected, via the one or more hardware processors;
performing a root-cause analysis to determine at least one cause of the detected faulty operation of the equipment, via the one or more hardware processors; and
estimating a Remaining Useful Life (RUL) of the equipment, via the one or more hardware processors.

6. A system for optimization of a Flue Gas Desulphurization (FGD) process, comprising:
one or more hardware processors;
a communication interface; and
a memory storing a plurality of instructions, the plurality of instructions when executed, cause the one or more hardware processors to:

collect a plurality of plant data using a plurality of sensors, from a FGD process being monitored, as input data, wherein the plurality of plant data comprises real-time and non-real-time data;
pre-process the input data by removing one or more unwanted components from the input data;
perform a dimensionality reduction on pre-processed input data, comprising:
performing a feature selection, wherein the feature selection comprising identifying a plurality of features affecting each of a plurality of Key Performance Indicators (KPIs) of the FGD process, from the pre-processed input data, wherein the plurality of KPIs are a plurality of Process Variables PVs) representing a running state of the FGD plant and in turn the FGD process being monitored, and wherein the plurality of PVs comprise chimney inlet Sulphur dioxide ($SO_2$) concentration, absorption tower level, absorption tower pH, booster upper fan power consumption, limestone slurry concentration inside tower, and gypsum conversion; and
extracting the plurality of features by performing a feature extraction;
generate a plurality of predictive models based on the plurality of features extracted, for each KPI;
select one of the plurality of predictive models as a predictive model for processing the input data;
compensate for one or more unmeasured parameters of the selected predictive model using information generated using one or more soft-sensors, wherein the one or more unmeasured parameters comprise one or more PVs among the plurality of PVs;
perform the optimization of the FGD process, comprising:
simulating the operation of the FGD process using the selected predictive model, comprising predicting a plurality of FGD process parameters by the selected predictive model;
estimating a plurality of optimal set points of operation, in real time, from the predicted plurality of FGD process parameters;
determining at least one performance lapse in the FGD process, based on the estimated plurality of optimal set points of operation; and
generating at least one recommendation to optimize the FGD process, in response to the determined at least one performance lapse, wherein the at least one recommendation comprise an optimal set points of a plurality of Manipulated Variables (MVs) of the FGD plant, wherein the plurality of MVs comprise limestone slurry flow rate, limestone slurry concentration, air flow for oxidation, gypsum purging, number of recirculation pumps, and elevation of spray for the pumps, and wherein the plurality of MVs are adjusted by a control system of the FGD plant to bring desirable effects in the plurality of PVs;
continuously push the optimal set points of the plurality of MVs into the FGD plant at predefined time intervals to optimize operation of the FGD process; and
detecting deviation in working of one or more equipment in the FGD plant by comparing the selected predictive model with one or more working models of the one or more equipment, wherein upon detecting deviation an alarm is generated to alert a user about a potential equipment failure.

7. The system as claimed in claim 6, wherein the system selects the predictive model from the plurality of predictive models, by:
  estimating performance value of each of the plurality of predictive models, for a given test dataset;
  comparing the estimated performance value of each of the plurality of predictive models with estimated composite model score of each of the other predictive models; and
  selecting a predictive model having the highest value of composite model score amongst the plurality of predictive models, as the predictive model for processing the input data.

8. The system as claimed in claim 6, wherein the system generates a plurality of FGD process parameters while simulating the operation of the FGD process using the selected predictive model.

9. The system as claimed in claim 6, wherein the system validates performance of the selected predictive model, by:
  estimating the error in prediction of the plurality of FGD process parameters for the selected predictive model;
  calculating a health score of the selected predictive model, based on the estimated error in prediction of the plurality of FGD process parameters;
  comparing the calculated health score with a threshold health score; and
  correcting the selected predictive model if the calculated health score exceeds the threshold health score.

10. The system as claimed in claim 6, wherein the system performs an equipment monitoring using one or more of the predictive models, by:
  monitoring at least one equipment in the FGD process for a faulty operation, based on data in at least one predictive model of the at least one equipment, via the one or more hardware processors;
  generating an alarm if at least one instance of the faulty operation is detected, via the one or more hardware processors;
  performing a root-cause analysis to determine at least one cause of the detected faulty operation of the equipment, via the one or more hardware processors; and
  estimating a Remaining Useful Life (RUL) of the equipment, via the one or more hardware processors.

11. A non-transitory computer readable medium for optimization of a Flue Gas Desulphurization (FGD) process, wherein the non-transitory computer readable medium performs optimization of the FGD process by:
  collecting a plurality of plant data using a plurality of sensors, from a FGD process being monitored, as input data, via one or more hardware processors, wherein the plurality of plant data comprises real-time and non-real-time data;
  pre-processing the input data, comprising removing one or more unwanted components from the input data via the one or more hardware processors;
  performing a dimensionality reduction on pre-processed input data, via the one or more hardware processors, comprising:
    performing a feature selection, wherein the feature selection comprising identifying a plurality of features affecting each of a plurality of Key Performance Indicators (KPIs) of the FGD process, from the pre-processed input data, wherein the plurality of KPIs are a plurality of Process Variables (PVs) representing a running state of the FGD plant and in turn the FGD process being monitored, and wherein the plurality of PVs comprise chimney inlet Sulphur dioxide ($SO_2$) concentration, absorption tower level, absorption tower pH, booster upper fan power consumption, limestone slurry concentration inside tower, and gypsum conversion; and
    extracting the plurality of features by performing a feature extraction;
  generating a plurality of predictive models based on the plurality of features extracted, for each KPI, via the one or more hardware processors;
  selecting one of the plurality of predictive models as a predictive model for processing the input data, via the one or more hardware processors;
  compensating for one or more unmeasured parameters of the selected predictive model using information generated using one or more soft-sensors, via the one or more hardware processors, wherein the one or more unmeasured parameters comprise one or more PVs among the plurality of PVs;
  performing the optimization of the FGD process, via the one or more hardware processors, comprising:
    simulating the operation of the FGD process using the selected predictive model, comprising predicting a plurality of FGD process parameters by the selected predictive model;
    estimating a plurality of optimal set points of operation, in real time, from the predicted plurality of FGD process parameters;
    determining at least one performance lapse in the FGD process, based on the estimated plurality of optimal set points of operation; and
    generating at least one recommendation to optimize the FGD process, in response to the determined at least one performance lapse, wherein the at least one recommendation comprise an optimal set points of a plurality of Manipulated Variables (MVs) of the FGD plant, wherein the plurality of MVs comprise limestone slurry flow rate, limestone slurry concentration, air flow for oxidation, gypsum purging, number of recirculation pumps, and elevation of spray for the pumps, and wherein the plurality of MVs are adjusted by a control system of the FGD plant to bring desirable effects in the plurality of PVs;
    continuously pushing the optimal set points of the plurality of MVs into the FGD plant at predefined time intervals to optimize operation of the FGD process; and
    detecting deviation in working of one or more equipment in the FGD plant by comparing the selected predictive model with one or more working models of the one or more equipment, wherein upon detecting deviation an alarm is generated to alert a user about a potential equipment failure.

12. The non-transitory computer readable medium as claimed in claim 11, wherein selecting the predictive model from the plurality of predictive models, comprising:
  calculating values of different performance metrics of the plurality of predictive models;
  estimating a composite model score of each of the plurality of predictive models, for a given test dataset;
  comparing the estimated composite model score of each of the plurality of predictive models with estimated composite model score of each of the other predictive models; and
  selecting a predictive model having the highest value of the composite model score amongst the plurality of predictive models, as the predictive model for processing the input data.

13. The non-transitory computer readable medium as claimed in claim 11, wherein the selected predictive model generates a plurality of FGD process parameters while simulating the operation of the FGD process.

14. The non-transitory computer readable medium as claimed in claim 11, wherein performance of the selected predictive model is validated, comprising:
   estimating the error in prediction of the plurality of FGD process parameters for the selected predictive model;
   calculating a health score of the selected predictive model, based on the estimated error in prediction of the plurality of FGD process parameters;
   comparing the calculated health score with a threshold of health score; and
   correcting the selected predictive model if the calculated health score exceeds the threshold health score.

15. The non-transitory computer readable medium as claimed in claim 11, wherein an equipment monitoring is performed using one or more of the predictive models, comprising:
   monitoring at least one equipment in the FGD process for a faulty operation, based on data from at least one predictive model of the at least one equipment, via the one or more hardware processors;
   generating an alarm if at least one instance of the faulty operation is detected, via the one or more hardware processors;
   performing a root-cause analysis to determine at least one cause of the detected faulty operation of the equipment, via the one or more hardware processors; and
   estimating a Remaining Useful Life (RUL) of the equipment, via the one or more hardware processors.

* * * * *